United States Patent
Maloberti

(10) Patent No.: US 9,746,104 B2
(45) Date of Patent: Aug. 29, 2017

(54) DEVICE FOR LAYING AN ELONGATE ELEMENT IN A STRETCH OF WATER, ASSOCIATED INSTALLATION AND ASSOCIATED METHOD

(71) Applicant: TECHNIP FRANCE, Courbevoie (FR)

(72) Inventor: René Maloberti, Champigny sur Marne (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/895,787

(22) PCT Filed: Jun. 4, 2014

(86) PCT No.: PCT/EP2014/061619
§ 371 (c)(1),
(2) Date: Feb. 4, 2016

(87) PCT Pub. No.: WO2014/195369
PCT Pub. Date: Dec. 11, 2014

(65) Prior Publication Data
US 2016/0153584 A1    Jun. 2, 2016

(30) Foreign Application Priority Data

Jun. 5, 2013 (FR) ...................................... 13 55171
Jun. 19, 2013 (FR) ...................................... 13 55771

(51) Int. Cl.
*F16L 1/20* (2006.01)
*F16L 1/235* (2006.01)
(Continued)

(52) U.S. Cl.
CPC ............ *F16L 1/207* (2013.01); *B66D 1/7447* (2013.01); *B66D 1/7489* (2013.01); *F16L 1/19* (2013.01);
(Continued)

(58) Field of Classification Search
CPC combination set(s) only.
See application file for complete search history.

(56) References Cited

U.S. PATENT DOCUMENTS

| 4,218,025 A | 8/1980 | Andrews |
| 2013/0251456 A1* | 9/2013 | Haugen ..................... F16L 1/16 405/166 |

FOREIGN PATENT DOCUMENTS

| EP | 0 345 673 A1 | 12/1989 |
| EP | 0 505 264 A1 | 9/1992 |
| WO | WO 2012/044179 | 4/2012 |

OTHER PUBLICATIONS

International Search Report dated Jun. 25, 2014 issued in corresponding International patent application No. PCT/EP2014/061619.

* cited by examiner

*Primary Examiner* — Kyle Armstrong
(74) *Attorney, Agent, or Firm* — Ostrolenk Faber LLP

(57) ABSTRACT

This device comprises a drum (42) to be driven in rotation about a central axis (B-B'), wherein the drum (42) defines a circumferential casing (50) for winding the elongate element around the central axis (B-B'), wherein the elongate element is intended to form at least one turn around the central axis (B-B') on the circumferential casing (50). It comprises a mechanism (44) for driving the turn(s) of the elongate element along the circumferential casing (50). The drive mechanism (44) comprises at least one assembly (80) following movement of the turn in a direction of movement (D) forming a non-zero angle with the local axis of the turn, taken at a contact region of the turn on the movement assembly (80).

13 Claims, 5 Drawing Sheets

(51) Int. Cl.
 *B66D 1/74* (2006.01)
 *F16L 1/19* (2006.01)
(52) U.S. Cl.
 CPC ............... *F16L 1/203* (2013.01); *F16L 1/205* (2013.01); *F16L 1/235* (2013.01)

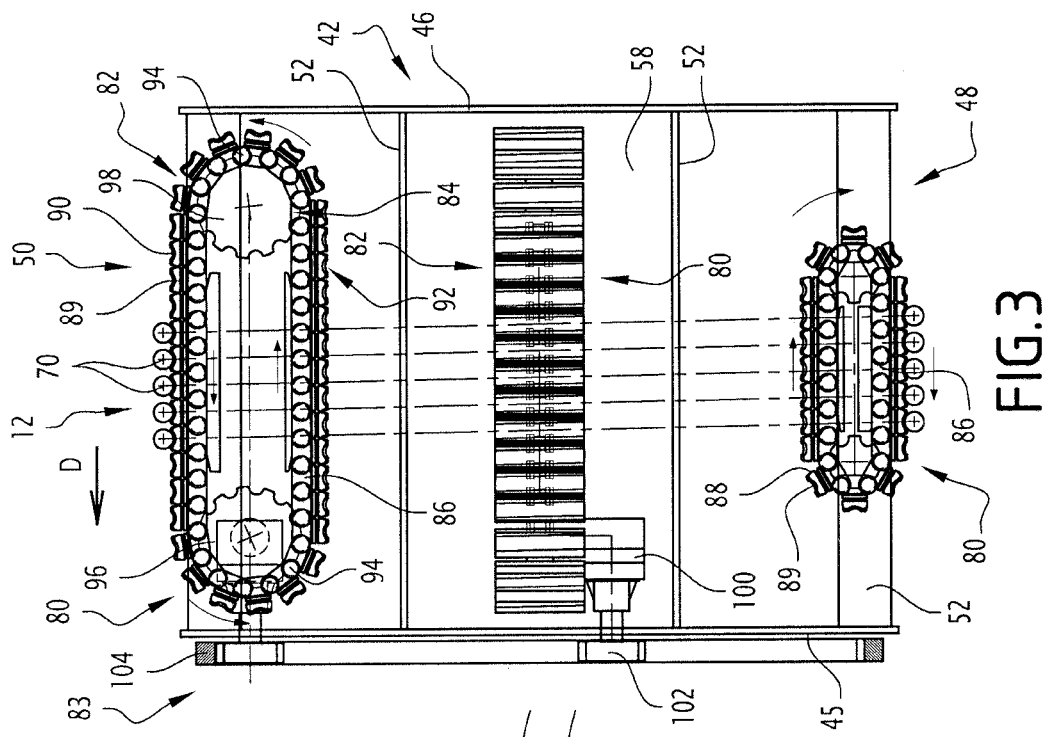
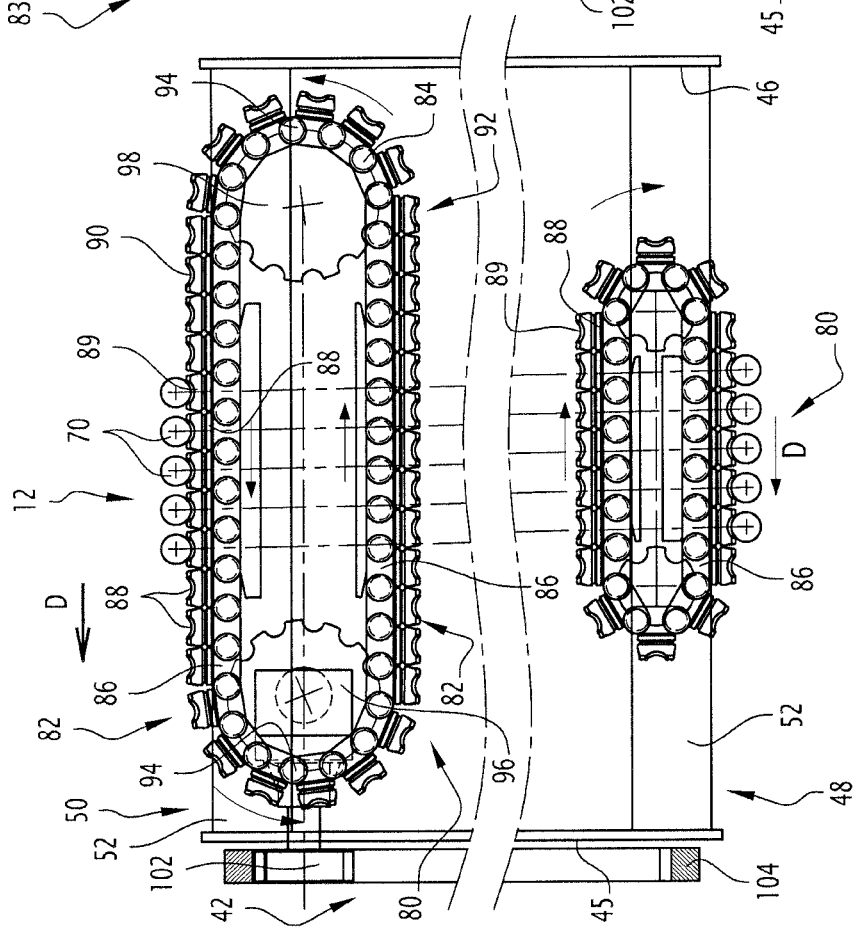

DEVICE FOR LAYING AN ELONGATE ELEMENT IN A STRETCH OF WATER, ASSOCIATED INSTALLATION AND ASSOCIATED METHOD

CROSS-REFERENCE TO RELATED APPLICATIONS

The present application is a 35 U.S.C. §§371 national phase conversion of PCT/EP2014/061619, filed Jun. 4, 2014, which claims priority of French Patent Application No. 13 55171, filed Jun. 5, 2013, the contents of which are incorporated by reference herein and French Patent Application No. 13 55771, filed Jun. 19, 2013, the contents of which are incorporated by reference herein. The PCT International Application was published in the French language.

The present invention relates to a device for laying an elongate organ in a stretch of water, comprising:
- a drum intended to be driven in rotation about a central axis, wherein the drum defines a circumferential casing for winding the elongate organ about the central axis, wherein the elongate organ is intended to form at least one turn about the central axis along the circumferential casing;
- a mechanism for driving the turn(s) of the elongate organ along the circumferential casing.

The elongate organ is, for example, a pipe. The pipe is especially designed to carry oil collected in the bottom of the stretch of water to the surface of the stretch of water.

The pipe is, in particular, a flexible pipe stored in a floating structure and unwound in the stretch of water through the laying device.

In all that follows, a flexible pipe is especially a pipe as described in normative documents published by the American Petroleum Institute (API) API 17J and API RP17B, which are well known to the person skilled in the art.

This definition equally encompasses flexible pipes of unbonded or bonded types.

More generally, and alternatively, the flexible pipe is a composite of the "bundle" type, comprising at least one fluid conveyance tube and a plurality of electrical or optical cables suitable for carrying electrical or hydraulic power or information between the bottom and the surface of the stretch of water.

In another variant, the pipe is an umbilical pipe as described in normative documents of the American Petroleum Institute (API) API17E.

More generally still, the elongate organ is a cable forming, for example, a line of descent of an object in the stretch of water. This cable is, for example, a metal cable or a cable made of synthetic fibres.

To deploy flexible conduits, it is known to unroll them from storage means present on the ship. The storage means are especially a basket or a rotating drum.

The conduit is unwound from a storage means, and is generally raised via a channel on a tower of the laying device.

Next, the conduit is part of sensing and movement assemblies including chain tensioning. Thus the conduit descends vertically or obliquely along the tower before submersing into the stretch of water.

The conduit is retained by the tensioning means which ensure its suspension in the stretch of water. In addition, the tensioning means support the mechanical tension resulting from the weight of the unwound pipe and avoid the storage means having to support this weight, while ensuring that the conduit is not subject to any bending that goes beyond its Minimal Bending Radius without causing damage ("MBR" or "Minimal Bending Radius" in English).

Another method of laying is the so-called "S-lay method". The elongate organ stored in a basket is deployed in the stretch of water through the back of the laying structure while being guided by a guiding channel designed by the English term "stinger".

Tensioning means positioned on the deck of the ship or on the stinger generally determine the speed of the unwinding of the conduit.

In another known laying device, the presence of tensioning means is not necessary. In this case, the elongate organ is wound around the drum of a winch between the storage means and the stretch of water. The elongate organ forms a plurality of turns wound around the drum axis to provide a retaining tension of the elongate organ section introduced into the stretch of water. This retention is based on the principle of the "capstan" effect.

To ensure the deployment of the elongate organ in the stretch of water, the drum is motorised and the elongate organ is gradually unwound in the stretch of water.

One such laying device is simple and compact. However, it is not completely satisfactory.

In order to ensure effective retention of the immersed section of the elongate organ, it is necessary to have a large number of turns around the drum to ensure sufficient friction between the turns of the elongate organ and the drum. However, this high friction constraint acts against the need to ensure sliding of the elongate organ between its point of entry on the drum and its point of exit from the drum, in order to slide laterally the other turns already introduced on the drum.

When the tension applied to the elongate organ is significant, it is difficult to implement a laying device using the capstan effect because the lateral forces required to push the turns are too great, and produce adverse effects on the elongate organ, such as crushing, rotation or twisting of the elongate organ.

To overcome this problem, WO 2012/044179 discloses a laying device of the above-mentioned type, wherein an endless chain is wound around the drum along a helical path which continuously follows the local axis of the turns of the elongate organ.

The chain is provided with pads which serve to guide and move the elongate organ progressively as it unwinds in the stretch of water, by driving the drum in rotation about its axis.

This solution improves the unwinding of the elongate organ. However, it requires a bulky laying device, while the management of the transmission of forces between the chain and the drum is not easy to implement.

The return section of the chain section between the exit from and the entrance to the drum added to the device size, makes the passage of the upper radially extending sections of the elongate organ, such as the end pieces, difficult.

Thus, an object of the invention is to design a device for laying an elongate organ in a stretch of water that is simple to implement, while providing compactness and maximum ease of use, particularly with an elongate organ having major radially extending sections.

To this end, the invention relates to a device of the above-mentioned type, characterised in that the drive mechanism comprises at least an assembly to move the turn in a direction of movement forming a non-zero angle with the local axis of the turn at a contact region of the turn on the movement assembly.

The device according to the invention may include one or more of the following features, in isolation or in any technically feasible combination:
- the direction of movement forms an angle of at least 10°, preferably at least 45° with the local axis of the turn measured at a contact region of the turn on the movement assembly;
- the direction of movement forms an angle of less than 80°, preferably less than 45° with an axis parallel to the central axis of the drum rotation, the movement direction preferably being parallel to the central axis of the drum rotation;
- the movement assembly extends angularly around the central axis over an angular extent less than 360°, in particular less than 45°;
- the drive mechanism comprises a plurality of movement assemblies of the or each turn in a direction of movement, wherein the direction of movement forms a non-zero angle with the local axis of the turn, taken at a contact region of the turn over the entire movement, wherein the movement assemblies are distributed angularly around the central axis;
- the movement assembly has an endless organ that is movable in the direction of movement, and an assembly to set in motion the endless organ, wherein the endless organ and the setting in motion assembly are carried by the drum to be moved jointly with the drum in rotation about the central axis;
- the endless organ comprises a chain and a plurality of pads mounted on the chain, wherein each pad defines a channel to receive a turn of the elongate organ;
- the setting in motion assembly is adapted to move the endless organ in the direction of movement by the effect of the driving in rotation of the drum about the central axis;
- the drum comprises two lateral flanges and a linkage assembly connecting the two side flanges, wherein the linkage assembly defines the circumferential casing, and wherein the linkage assembly delimits at least one outer channel for each movement assembly to receive the movement assembly opening radially away from the central axis;
- the linkage assembly comprises a plurality of axial beams connecting the flanges to one another, wherein the outer receiving channel is delimited by two adjacent axial beams;
- an outer section of the endless organ is received in the outer channel, wherein the linkage assembly delimits an inner channel to receive an inner section of the endless organ, and wherein the inner channel opens radially towards the central axis, opposite to the outer channel;
- it comprises a plurality of movement assemblies, wherein an outer section of the endless organ of each movement assembly is received in an outer channel, and an inner section of the endless organ of each movement assembly is received in an inner channel, wherein at least a first group of inner channels is offset radially away from the central axis with respect to a second group of inner channels;
- it comprises a radial displacement mechanism of a region of the movement assembly away from the central axis, or towards the central axis.

The invention also relates to an installation for laying of an elongate organ in a stretch of water, characterised in that it comprises:
- a surface assembly extending on the surface of the stretch of water;
- a device as described above, carried by the surface assembly, wherein the drum is rotatably mounted on the surface assembly around the central axis;
- an elongate organ having at least one turn wound around the drum, wherein a contact region of the turn is arranged on the movement assembly, and the direction of movement defined by the movement assembly forms a non-zero angle with the local axis of the turn measured at the contact region.

The invention also relates to a method of laying an elongate organ in a stretch of water, comprising the following steps:
- providing an installation as described above, wherein the elongate organ has at least one turn wound around the drum;
- rotating the drum about the central axis to lower or raise the elongate organ in the stretch of water;
- simultaneously, moving by the movement assembly of at least one turn of the elongate organ in a direction of movement forming a non-zero angle with the local axis of the turn at a contact region supporting the turn on the movement assembly.

The invention will be better understood by reading the description below, which is given solely by way of example and with reference to the accompanying drawings:

FIG. 3 shows a partial sectional view along the median axial plane of FIG. 2;

FIG. 4 shows an enlarged view of several details of FIG. 3, illustrating the movement organs of the turns of the elongate element;

Figure 1:
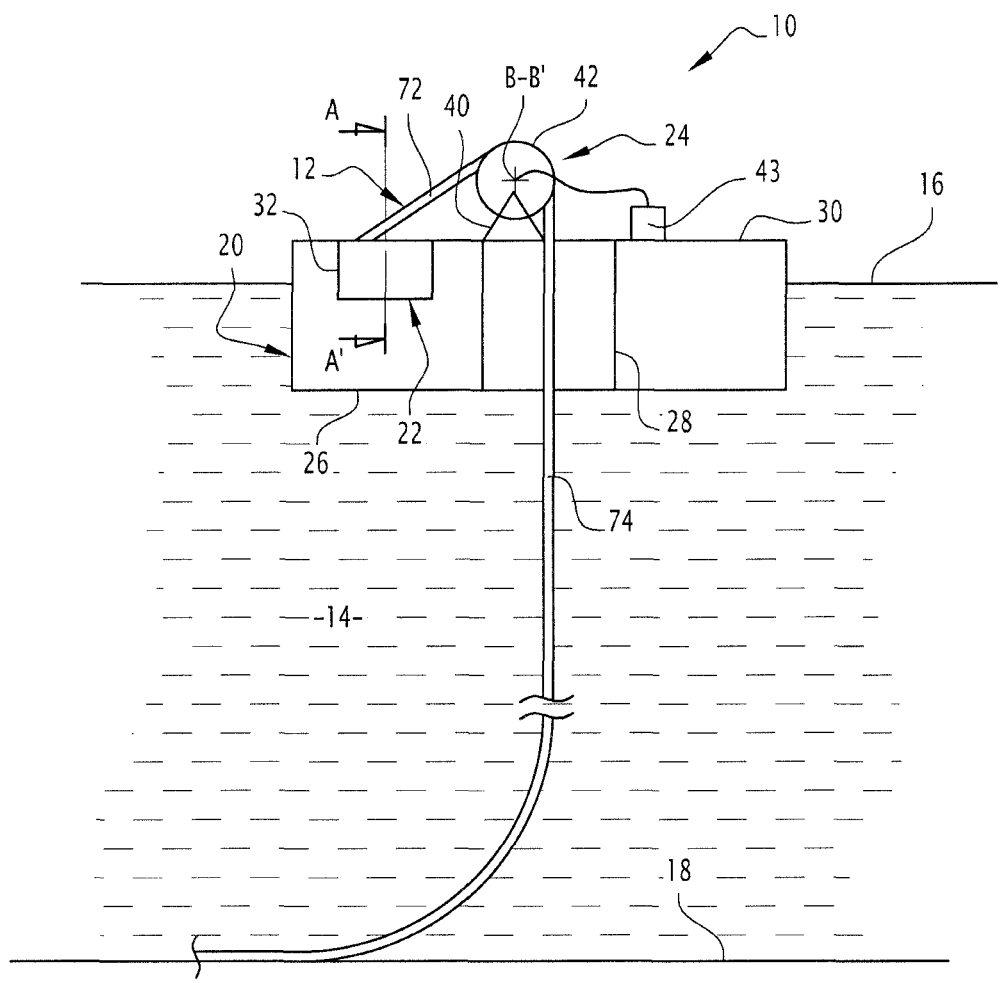
FIG. 1 shows a schematic view of a first installation for laying an elongate organ in a stretch of water, comprising a laying device according to the invention.

A first laying installation 10 according to the invention is shown in FIGS. 1 to 5.

The installation 10 is intended for laying an elongate element 12 in a stretch of water 14.

The stretch of water 14 is, for example, a sea, an ocean or a lake. The depth of the stretch of water 14 between the surface 16 and the bottom 18 in line with the installation 10 is greater than 10 meters and, in particular, between 100 meters and 4000 meters.

The elongate element 12 is, for example, a pipe. The pipe is especially designed to carry oil collected in the bottom of the stretch of water to the surface of the stretch of water.

In particular, the pipe is a flexible pipe unwound in the stretch of water 14 through the laying installation 10.

In all that follows below, a flexible pipe is especially a pipe as described in normative documents published by the American Petroleum Institute (API) API 17J and API RP17B, which are well known to the person skilled in the art.

This definition equally encompasses flexible pipes of the type unbonded ("unbonded" in English or bonded type ("bonded" in English").

More generally, and alternatively, the flexible pipe is a composite beam of the "bundle" type, comprising at least one fluid conveyance tube and a plurality of electrical or optical cables suitable for carrying electrical or hydraulic power or information between the bottom and the surface of the stretch of water.

In another variant, the pipe is an umbilical pipe as described in normative documents of the American Petroleum Institute (API) API17E.

More generally still, the elongate organ 12 is a cable forming, for example, a line of descent of an object in the stretch of water. This cable is, for example, a metal cable or a cable made of synthetic fibres. The elongate element 12 may carry equipment such as nozzles or equipment to be used on the bottom which locally have a greater average transversal extent than the transversal extent of the elongate element 12.

Referring to FIG. 1, the laying installation 10 comprises a surface assembly 20, a storage assembly 22 of the elongate element 12 carried by the surface assembly 20, and a laying device 24 according to the invention, formed by a capstan winch.

The surface assembly 20 is partially immersed in the stretch of water 14. Preferably, the surface assembly 20 floats on the surface 16 of the stretch of water 14. It is, for example, formed by a laying ship, a platform or a barge.

In the example shown in FIG. 1, the surface assembly 20 has a hull 26 floating on the stretch of water 14. The hull preferably delimits a wellbore 28 intended to receive the descent of the elongate element 12 in the stretch of water 14.

The wellbore 28 passes through the hull 26. It opens up on a deck 30 of the hull 26. It opens downwards into the stretch of water 24.

The storage assembly 22 is formed by a rotary organ 32 storing the elongate element 12 in a wound configuration. The rotary organ 32 is, for example, a drum or a basket.

The storage assembly 22 is arranged on the deck 30 or in the hull 26.

The rotation of the storage organ 32 in a first direction about its axis A-A' allows the unwinding of an increasing length of the elongate element 12 towards the laying device 24, while rotation in a second direction opposite to the first direction allows the rewinding of an increasing length of the elongate element 12 on the storage organ 32.

Referring to FIG. 1, the laying device 10 comprises a support 40 fixedly mounted on the surface assembly 20, a drum 42 mounted to rotate about a central axis B-B', and a drive unit 43 for driving the rotation of the drum 42 about the central axis B-B'.

As shown in FIGS. 2 to 5, the laying device 10 according to the invention further comprises a drive mechanism 44 for driving at least one turn of the elongate element 12 on the drum 42 as described in detail below.

In this example, the central axis B-B' of rotation of the drum 42 is horizontal.

Referring to FIG. 3, the drum 42 comprises two lateral opposing flanges 45, 46 and a linkage assembly 48 connecting the flanges 45, 46 defining a circumferential casing 50 for winding the elongate element 12 about the central axis B-B'.

In this example, each flange 45, 46 is formed by a disc-shaped organ extending transversely with respect to the axis B-B'.

The linkage assembly 48 forms a barrel of the drum 42. It comprises here a plurality of axial beams 52, 54 connecting the flanges 45, 46 together, parallel to the axis B-B'.

Figure 2:
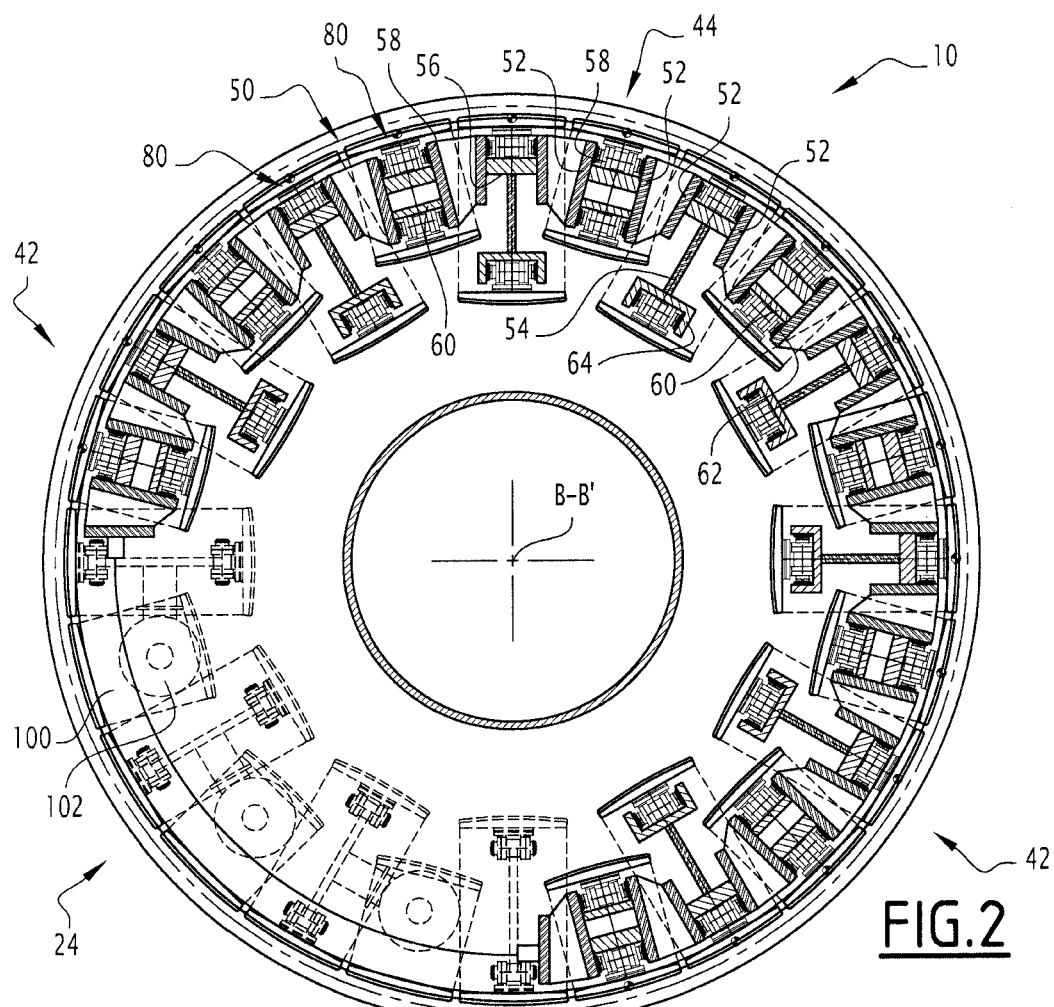
FIG. 2 shows a view, taken partly in section along a plane extending transversely to the axis of rotation of a drum of the laying device of FIG. 1.
Figure 5:
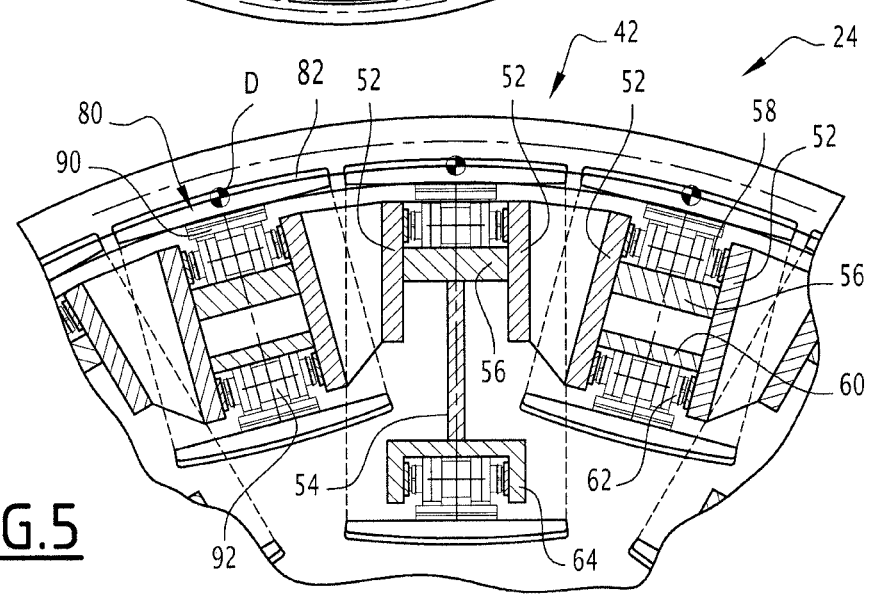
FIG. 5 shows a view of a detail marked V in FIG. 2.

As shown in FIG. 2, the linkage assembly 48 thus comprises a first group of axial outer beams 52, distributed angularly about the axis B-B' and a second group of axial inner beams 54, arranged closer to the axis B-B' than the axial outer beams 52.

In this example, the outer beams 52 are arranged in pairs of parallel beams. The outer beams 52 of each pair are connected, two by two, by an outer bottom wall 56.

Thus, the outer beams 52 define a plurality of outer channels 58, closed towards the axis B-B' by the bottom wall 56 and opening outwards away from the axis B-B'.

The outer channels 58 are angularly distributed about the axis B-B'. Each outer channel 58 extends here along a direction of movement D intended to form a non-zero angle with the local axis of each turn of the elongate element 12 wound around the drum 42.

In this example, the direction of movement D is parallel to the axis B-B'.

Advantageously, each outer channel 58 extends continuously to the respective flanges 45, 46.

In addition, first sections of the outer pairs of beams 52 are connected in pairs by an inner bottom wall 60. They therefore define a first group of inner channels 62, closed away from the axis B-B' by the inner bottom wall 60 and opening inwards towards the axis B-B'.

In this example, each inner beam 54 projects from the bottom wall 60 of one pair of outer beams 52.

Each inner beam 54 carries an inner channel 64 of a second group of inner channels 64.

Each inner channel 64 is closed away from the axis B-B' and opens inwards towards the axis B-B'.

The inner channels 64 of the second group of inner channels 64 are located closer to the axis B-B' than the inner channels 62 of the first group of inner channels 62.

In a preferred embodiment, the inner channels 62 of the first group are staggered relative to the inner channels 64 of the second group.

More generally, each inner channel 62, 64 extends opposite an outer channel 58 in a direction parallel to the direction of movement D.

Each inner channel 62, 64 extends continuously between the flanges 45, 46.

The staggered arrangement of the inner channels 62, 64 ensures maximum compactness of the drive mechanism 44.

The drum 42 is adapted to be driven in rotation about the central axis B-B' by the drive unit 43 to allow the unwinding of the elongate element 12 from the storage assembly 22 towards the stretch of water 14.

To this end, and as shown in FIGS. 1 and 4, the elongate element 12 is partially wound helically around the drum 42 by forming a plurality of turns 70 tight on the circumferential casing 50.

Thus, the elongate element 12 has an untensioned upstream segment 72 extending in a chain between the storage assembly 22 and the drum 42 and a tensioned downstream section 74 extending from the drum 42 to the stretch of water 14, preferably vertically through the wellbore 28.

To ensure effective unwinding of the elongate element 12, the drive mechanism 44 comprises, according to the invention, at least one movement assembly 80 of each turn 70 following a direction of movement D forming a non-zero angle with a local axis C-C' of the turn 70 at the contact region 82 of the turn 70 on the movement assembly 80.

It further comprises an activation assembly 83 for each movement assembly 80.

Preferably, the direction of movement D forms an angle of at least 10°, advantageously of at least 45°, and more preferably at least 80° with the local axis C-C'.

Furthermore the direction of movement D forms an angle less than 80°, in particular less than 45°, and preferably substantially zero with an axis parallel to the central axis B-B' passing through the contact region 82.

Thus, in the example shown in FIGS. 3 and 4, the direction of movement D is parallel to the central axis B-B'.

As shown in FIG. 2, the drive mechanism 44 comprises a plurality of parallel movement assemblies 80 distributed angularly about the axis B-B'.

The angular extent of each movement assembly 80 about the axis B-B' is less than 45°.

At least one movement assembly 80 advantageously extends substantially along the entire width of the drum 42 between the flanges 45, 46.

In the example shown in FIGS. 2 to 4, each movement assembly 80 comprises an endless organ 82 movable in the direction of movement D and a setting in motion assembly 84 of the endless organ 82.

The endless organ 82 and its setting in motion assembly 84 are carried by the drum 42 and are movable in co-rotation with the drum 42.

Referring to FIG. 4, each endless organ 82 is closed on itself. In this example, it comprises a closed chain 86 and a plurality of pads 88 to receive the turns 70, mounted on the chain 86.

Each pad 88 delimits a channel 89 to receive a turn 70. The channel 89 extends along an axis that forms a non-zero angle with the direction of movement D. Preferably, in the example shown in the Figures, this angle is greater than 45°, especially greater than 80°.

When the turn 70 is received in the channel 89, the channel 89 defines a contact region of the turn 70. The turn 70 then has a local axis coincident with that of the channel 89 measured at the contact region.

The endless organ 82 thus has a linear outer axial section 90 intended to define partially the circumferential casing 50 for winding the elongate element 12, and a linear inner section 92 for rewinding.

The inner section 92 and outer section 90 are connected together by curved end sections 94 surrounding the setting in motion assembly 84.

The endless organ 82 thus has an elongated shape in the direction of movement D.

In the example of FIG. 3, the outer section 90 is received in an outer channel 58 and the inner section 92 is received in an inner channel 62, 64 located opposite the outer channel 58 receiving the outer section 90.

The setting in motion assembly 84 comprises, for each movement assembly 80, an active drive wheel 96, and a passive driven wheel 98. It further comprises a bevel gear 100 engaged with the drive wheel 96 and a peripheral satellite 102 intended to interact with the activation assembly 83.

The wheels 96, 98 have an outer toothing to engage with the endless organ 82 around the curved sections 94. They are each carried by the drum 42 and are mounted to rotate about an axis D-D' perpendicular to the direction of movement D.

The bell gear 100 comprises its own gear able to transmit a rotational movement of the satellite 102 about an axis substantially parallel to the central axis B-B', to the active drive wheel 96 to drive its rotation about the axis D-D'.

In this example, each satellite 102 projects axially along a lateral flange 45 of the drum 42.

The active drive wheel 96 is thus able to move the endless organ 82 around the wheels 96, 98. This movement causes a translation of the outer section 90 along the direction D in a first direction, and an opposite translation of the inner section 92 along the direction D in a second direction opposite to the first direction.

The activation assembly 83 is adapted to interact with each satellite 102 to cause the rotation of the satellite 102 during the rotation of the drum 42.

In this example, the activation assembly 83 comprises a ring gear 104 mounted fixed in rotation along a flange 45 of the drum 42.

Thus, the rotation of the drum 42 about the central axis B-B' causes a rotational movement of each satellite 102 in the ring gear 104, and hence a rotational movement of the satellite 102 about its axis.

A method of laying an elongate element 12 in a stretch of water 14 using the laying installation 10 is described below.

Initially, the elongate element 12 stored in the storage assembly 22 is brought to its place of laying by the surface assembly 20.

It is then unwound from the storage assembly 22 and wound around the circumferential casing 50 of the drum 42 to form a plurality of helical turns 70.

Each turn 70 is placed locally in contact with each movement assembly 80 in a contact region. In this example, each turn 70 is successively received in a channel 89 of a pad 88 that guides the turn 70 along a local axis C-C' in the region of contact on the movement assembly 80.

The elongate element 12 has then an untensioned upstream section 72 which extends between the storage assembly 22 and a first lateral edge of the circumferential casing 50 located adjacent to a first flange 46.

The turns 70 extend successively to a second lateral edge of the circumferential casing 50 located adjacent to a second flange 45.

The elongate element 12 also has a downstream section 74 extending vertically from the second lateral edge to the stretch of water 14, preferably through the wellbore 28.

The drive unit 43 is activated to lower the elongate element 12 by rotating the drum 42 about the axis B-B'.

This rotation causes the unwinding of an increasing length of the elongate element 12 from the storage assembly 22, and the insertion of a correspondingly increasing length of the elongate element 12 in the stretch of water 14.

The rotation of the drum 42 automatically activates the setting in motion assembly 84 of each endless organ 82.

In particular, each satellite 102 is rotated in the ring gear 104, causing rotation of the satellite about its axis 102. This rotational movement is transmitted to each drive wheel 96 through the bevel gear 100.

The rotation of the drive wheel 96 in turn causes rotation of the driven wheel 98 and movement of the outer section 90 of the endless organ 82 in the direction of movement D.

As the direction of movement D forms a non-zero angle with the local axis of each turn 70 in the region of contact on the movement assembly 80, the turn 70 shifts along the direction of movement D, in the direction going from the first flange 46, in the vicinity of which is the upstream section 72, towards the second flange 45 in the vicinity of which is the downstream section 74.

Thus, the downstream section 74 is retained very effectively on the circumferential casing 50 by the capstan effect. Furthermore, the movement of each turn 70 along the direction of movement D results in a gradual sliding of the turns 70 from one flange to the next, thus avoiding a blockage of the elongate element 12 on the drum 42.

The unwinding of the elongate element 12 thus occurs without difficulty, using a drive mechanism 44 of simple construction, and preferably activated directly by the rotation of the drum 42.

The laying device 24 is thus particularly effective, while having a minimal footprint.

Figure 6:
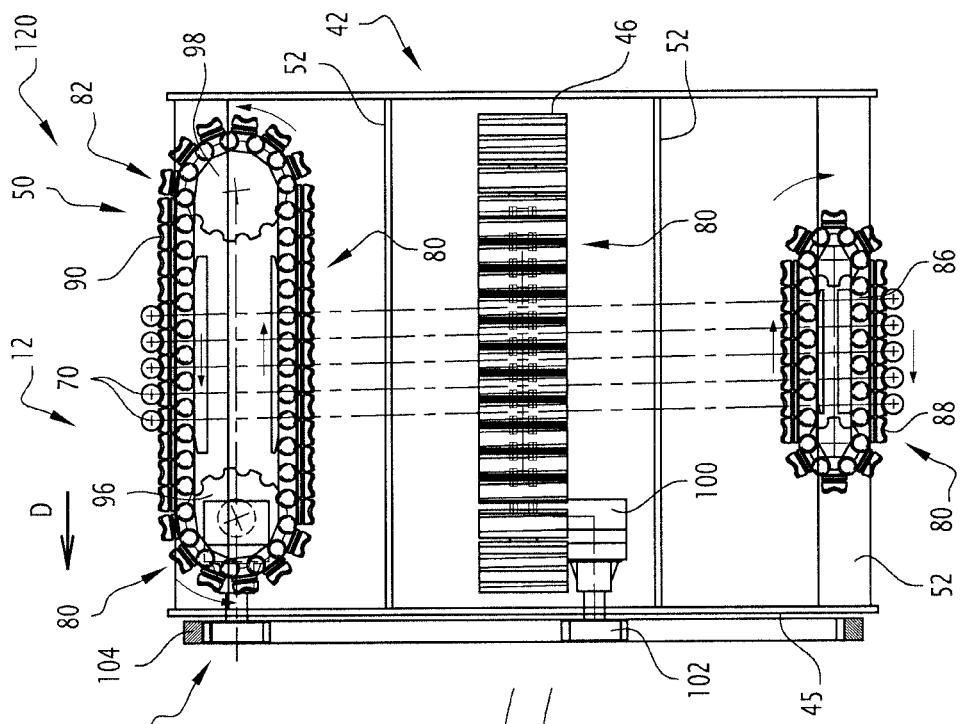
FIG. 6 shows a view similar to FIG. 3 of the laying device of a second installation according to the invention.
Figure 7:
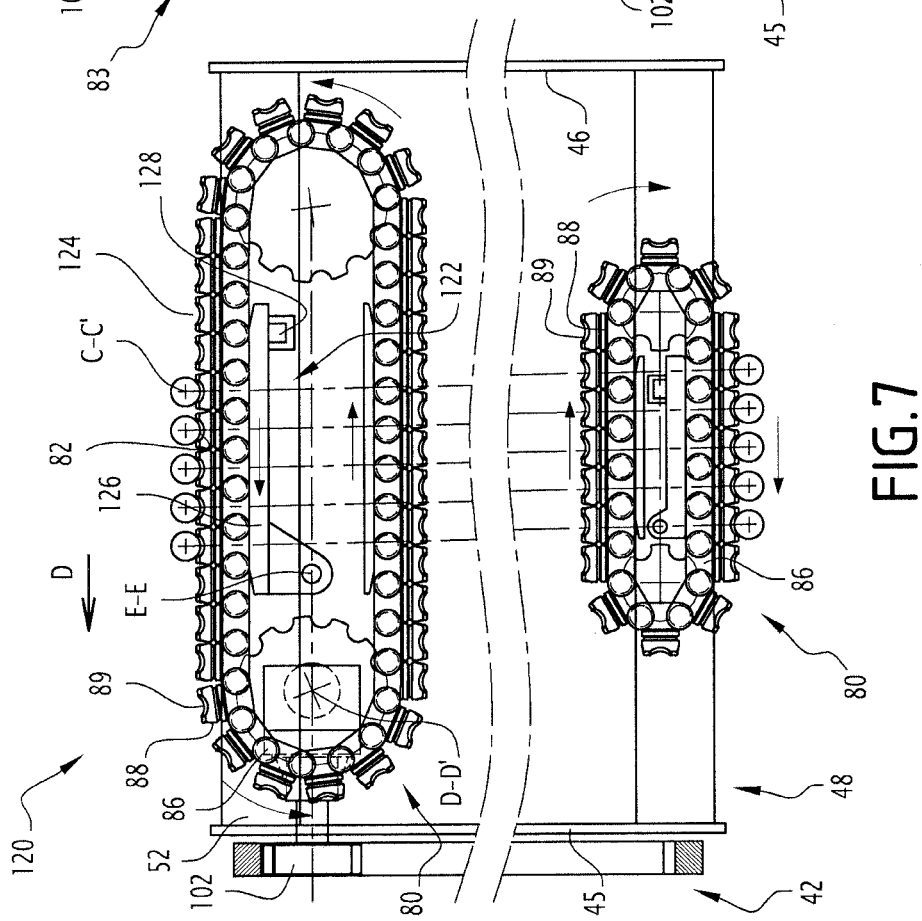
FIG. 7 shows a view similar to FIG. 4 of the laying device of the second installation according to the invention.

The laying device 24 of a second laying installation 120 according to the invention is shown in FIGS. 6 and 7.

Unlike the laying device 24 of the first installation 10, the device 24 comprises a radial movement mechanism 122 with at least one movement assembly 80.

In the example shown in FIG. 7, the mechanism 122 is adapted to move locally a region 124 of the outer section 90 of the endless organ 82 radially away from the central axis B-B'.

In this example, the mechanism 122 comprises a support plate 126 mounted to swivel about an axis E-E' perpendicular to the direction of movement D, and an actuator 128 for radial displacement of a region of the plate 126.

The plate 126 is engaged under the outer section 90. The actuator 128 is arranged under the plate 124, while the plate 124 is interposed between the actuator 128 and the outer section 90.

Thus, upon movement of the outer section 90 in the direction D, the actuator 128 is capable of being activated to lift locally the region 124 and cause a slight local inclination of the outer section 90 in order to ensure a more effective sliding of the turns 70 towards the flange 45.

Figure 8:
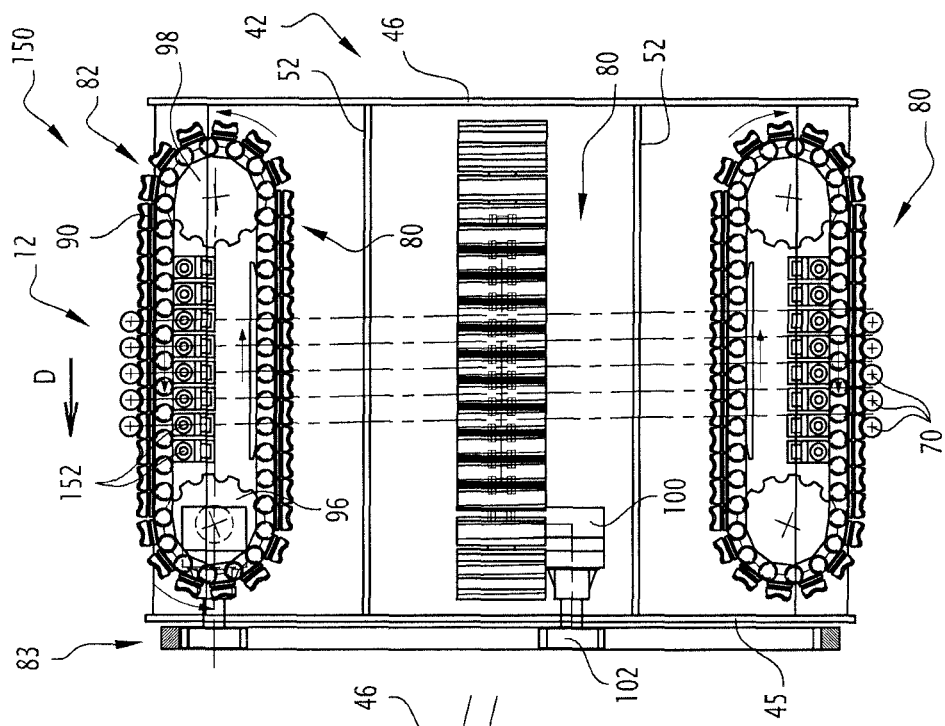
FIG. 8 shows a view similar to FIG. 3 of the laying device of a third installation according to the invention.
Figure 9:
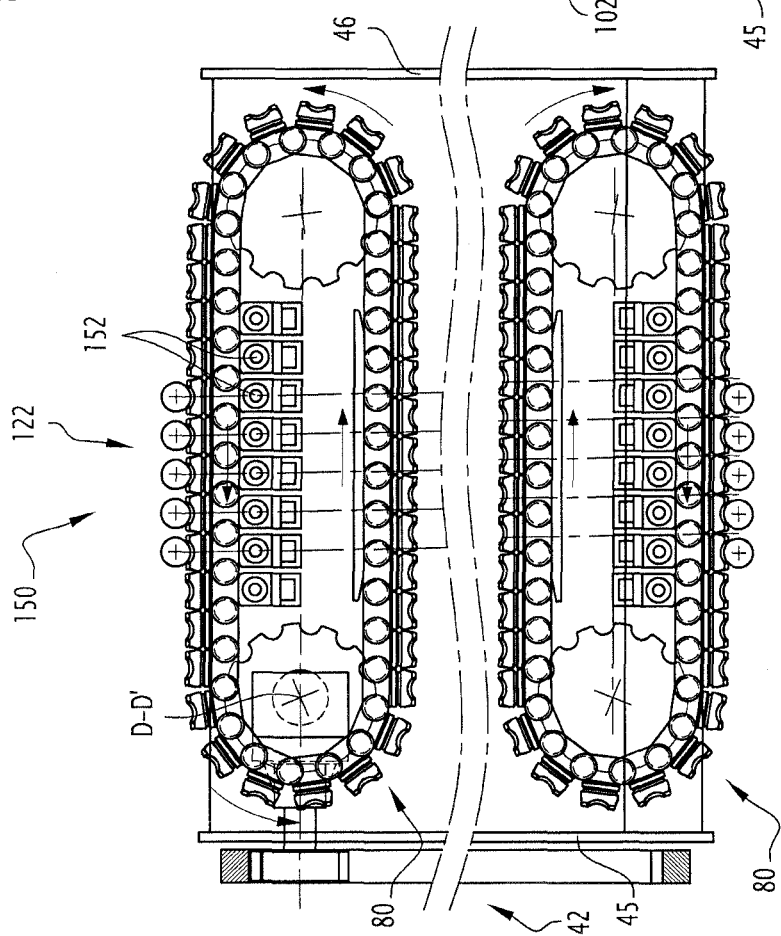
FIG. 9 shows a view similar to FIG. 4 of the laying device of the third installation according to the invention.

The laying device 24 of a third laying installation 150 according to the invention shown in FIGS. 8 and 9, differs from the device 24 of the second laying installation 120 in that the mechanism 122 has no support plate 124.

The mechanism 122 thus comprises a plurality of actuators 152 arranged parallel to each other in the direction of movement D to interact radially with the outer section 90. The actuators 152 are selectively driven to successively raise successive regions of the outer section 90 away from the central axis B-B'.

It follows from the description and figures that the movement assembly 80 is rotatably connected to the drum 42.

The invention claimed is:

1. A device for laying an elongate element in a stretch of water, comprising:
    a drum configured to be driven in rotation about a central axis (B-B'), the drum defining a circumferential casing for winding the elongate element on the casing around the central axis (B-B '), the elongate element and the casing being configured to form at least one turn about the central axis (B-B') on the circumferential casing, the drum further comprising
    a drive mechanism configured for driving the or each turn(s) of the elongate element on the circumferential casing; and
    the drive mechanism comprises a plurality of movement assemblies configured to move the turn along a direction of movement (D), said direction of movement and the local axis of the turn forming a non-zero angle at a contact region of the turn on the movement assemblies,
    the drum further comprising two laterally spaced apart flanges and a linkage assembly connecting the two laterally spaced apart flanges, and delimiting, for each movement assembly, an external channel configured to receive the movement assembly opening radially away from the central axis (B-B'),
    the linkage assembly including a plurality of axial beams connecting the flanges to each other, the external channel being defined by two adjacent axial beams,
    each movement assembly further comprising an endless organ configured to be moved along the direction (D), and a second assembly to set in motion the endless organ, the endless organ and the second assembly being carried by the drum in order for the second assembly to be moved in joint rotation with the drum about the central axis (B-B') and,
    each movement assembly further comprising an outer section of the endless organ received in the external channel, the linkage assembly delimiting an inner channel to receive an inner section of the endless organ, and the inner channel opening radially towards the central axis (B-B'), opposite the external channel, at least a first group of the inner channels being offset radially away from the central axis (B-B') relative to a second group of the inner channels.

2. The device according to claim 1, wherein the direction of movement (D) forms an angle of at least 10° with the local axis of the turn, taken at a contact region of the turn on the movement assembly.

3. The device according to claim 1, wherein the direction of movement (D) is parallel to the central axis of rotation (B-B') of the drum.

4. The device according to claim 1, wherein the movement assembly extends angularly around the central axis (B-B') over an angular extent of less than 360°.

5. The device according to claim 1, wherein the drive mechanism comprises a plurality of the movement assemblies of the or each turn(s) in a direction of movement (D), the direction of movement (D) forming a non-zero angle with the local axis of the turn, taken at a contact area of the turn on the movement assemblies, the movement assemblies being spaced angularly around the central axis (B-B').

6. The device according to claim 1, wherein the movement assembly comprises an endless organ configured to be moved along the direction of movement (D), and a second assembly to set in motion the endless organ, the endless organ and the second assembly being carried by the drum in order for the second assembly to be moved in joint rotation with the drum about the central axis (B-B').

7. The device according to claim 6, wherein the endless organ comprises a chain and a plurality of pads mounted on the chain, each pad defining a channel for receiving a turn of the elongate element.

8. The device according to claim 6, wherein the second assembly is configured to move the endless organ along the direction of movement (D) under the effect of the driving in rotation of the drum about the central axis (B-B').

9. The device according to claim 1, further comprising a radial movement mechanism of a region of the movement assembly away from the central axis (B-B'), or towards the central axis (B-B').

10. An installation for laying an elongate element in a stretch of water, comprising:
    a surface assembly extending on a surface of the stretch of water;
    a device according to claim 1, carried by the surface assembly, the drum being mounted on the surface assembly to rotate about the central axis (B-B'); and
    an elongate element having at least one turn wound around the drum, a contact region of the turn being supported on the movement assembly, the direction of movement (D) defined by the movement assembly forming a non-zero angle with the local axis of the turn taken at the contact region.

11. A method of laying an elongate element in a stretch of water, comprising the steps of:
providing an installation according to claim 10, the elongate element having at least one turn wound around the drum;
driving the drum to rotate about the central axis (B-B') in order to raise or lower the elongate element in the stretch of water; and
simultaneously moving by the movement assemblies of at least one turn of the elongate element in a direction of movement (D), said direction of movement and the local axis of the turn forming a non-zero angle at a contact region of the turn on the movement assemblies.

12. The device according to claim 1, wherein the direction of movement (D) forms an angle of at least 45° with the local axis of the turn, taken at a contact region of the turn on the movement assembly.

13. The device according to claim 1, wherein the movement assembly extends angularly around the central axis (B-B') over an angular extent of less than 45°.

* * * * *